US012684093B2

(12) United States Patent
An

(10) Patent No.: US 12,684,093 B2
(45) Date of Patent: *Jul. 14, 2026

(54) SURVEILLANCE CAMERA SYSTEM

(71) Applicant: HANWHA VISION CO., LTD.,
Seongnam-si (KR)

(72) Inventor: Byoung Man An, Seongnam-si (KR)

(73) Assignee: Hanwha Vision Co., Ltd., Seongnam-si
(KR)

( * ) Notice: Subject to any disclaimer, the term of this
patent is extended or adjusted under 35
U.S.C. 154(b) by 139 days.

This patent is subject to a terminal dis-
claimer.

(21) Appl. No.: 18/513,620

(22) Filed: Nov. 19, 2023

(65) Prior Publication Data

US 2024/0098220 A1 Mar. 21, 2024

Related U.S. Application Data

(63) Continuation of application No. 17/515,786, filed on
Nov. 1, 2021, now Pat. No. 11,863,908.

(30) Foreign Application Priority Data

Aug. 10, 2021 (KR) ........................ 10-2021-0105411

(51) Int. Cl.
*H04N 7/167* (2011.01)
*H04L 9/40* (2022.01)
*H04L 65/70* (2022.01)

(52) U.S. Cl.
CPC ....... *H04N 7/1675* (2013.01); *H04L 63/0428*
(2013.01); *H04L 63/0457* (2013.01); *H04L*
*65/70* (2022.05)

(58) Field of Classification Search
CPC ........ G08B 13/19667; G08B 13/19671; G08B
21/0476; H04L 63/0428; H04L 63/0457;
(Continued)

(56) References Cited

U.S. PATENT DOCUMENTS 5,689,442 A * 11/1997 Swanson .......... G08B 13/19647
380/217
7,320,069 B1 * 1/2008 Sundharraj ......... H04L 63/0428
348/E7.071
(Continued)

FOREIGN PATENT DOCUMENTS

CN 113906748 A * 1/2022 ............. H04N 19/17
EP 1359758 A1 * 11/2003 ......... H04L 63/0428
(Continued)

OTHER PUBLICATIONS

Yeongyun Kim, Sung Ho Jin, Tae Meon Bae and Yong Man Ro, "A
selective video encryption for the region of interest in scalable video
coding," TENCON 2007—2007 IEEE Region 10 Conference, Tai-
pei, Taiwan, 2007, pp. 1-4. (Year: 2007).*
(Continued)

*Primary Examiner* — Michael Simitoski
(74) *Attorney, Agent, or Firm* — McLean IP Global;
Jason Y. Pahng

(57) ABSTRACT

A method, performed by an image processing device, of
encrypting image data includes: selecting an encryption
target unit from among a plurality units constituting an
image; generating a table including identification informa-
tion about the encryption target unit; generating a first
encryption unit including data obtained by encrypting the
encryption target unit; generating a second encryption unit
including data obtained by encrypting the table; and gener-
ating a bitstream including the first encryption unit, the
second encryption unit, and units other than the encryption
target unit among the plurality of units constituting the
image.

7 Claims, 7 Drawing Sheets

(58) Field of Classification Search
CPC ... H04L 65/65; H04L 65/70; H04N 21/23418;
H04N 21/23476; H04N 21/23614; H04N
21/2362; H04N 21/8451; H04N 7/1675;
H04N 7/183
See application file for complete search history.

(56) References Cited

U.S. PATENT DOCUMENTS

| | | | | |
|---|---|---|---|---|
| 7,577,199 | B1* | 8/2009 | Herz | G08B 13/19676 |
| | | | | 375/240.16 |
| 7,895,616 | B2* | 2/2011 | Unger | H04N 21/454 |
| | | | | 725/31 |
| 8,656,183 | B2* | 2/2014 | Grab | H04N 21/4627 |
| | | | | 726/32 |
| 9,626,183 | B1* | 4/2017 | Smith | G06F 9/44542 |
| 10,769,909 | B1* | 9/2020 | Modestine | G06V 20/52 |
| 11,120,300 | B1* | 9/2021 | Ramanathan | G06V 20/52 |
| 11,416,542 | B1* | 8/2022 | Campbell | H04N 7/188 |
| 11,457,054 | B2* | 9/2022 | Soroushian | H04N 19/33 |
| 11,496,707 | B1* | 11/2022 | Crego | G06V 20/56 |
| 11,627,289 | B1* | 4/2023 | Siminoff | H04N 7/183 |
| | | | | 348/155 |
| 2002/0093955 | A1* | 7/2002 | Grand | H04L 69/323 |
| | | | | 370/469 |
| 2002/0188570 | A1* | 12/2002 | Holliman | H04N 7/1675 |
| | | | | 348/E7.056 |
| 2004/0081333 | A1* | 4/2004 | Grab | H04K 1/00 |
| | | | | 348/E7.056 |
| 2005/0078820 | A1* | 4/2005 | Hayashi | H04K 1/00 |
| | | | | 380/37 |
| 2005/0180573 | A1* | 8/2005 | Pelly | G11B 20/00115 |
| 2006/0165232 | A1* | 7/2006 | Burazerovic | H04N 21/6587 |
| | | | | 348/E7.071 |
| 2007/0030528 | A1* | 2/2007 | Quaeler | G06F 16/33 |
| | | | | 358/448 |
| 2007/0083467 | A1* | 4/2007 | Lindahl | G11B 20/00195 |
| | | | | 375/E7.009 |
| 2007/0258586 | A1* | 11/2007 | Huang | H04N 5/913 |
| | | | | 380/201 |
| 2008/0117295 | A1* | 5/2008 | Ebrahimi | G08B 13/19604 |
| | | | | 348/143 |
| 2009/0219392 | A1* | 9/2009 | Roskowski | H04N 7/18 |
| | | | | 348/143 |
| 2011/0158470 | A1* | 6/2011 | Martin | H04N 19/20 |
| | | | | 382/100 |
| 2012/0051539 | A1* | 3/2012 | Kar | H04N 21/6332 |
| | | | | 380/200 |
| 2012/0134540 | A1* | 5/2012 | Han | G08B 13/19671 |
| | | | | 382/103 |
| 2012/0254290 | A1* | 10/2012 | Naaman | G06Q 20/407 |
| | | | | 709/203 |
| 2013/0108105 | A1* | 5/2013 | Yoo | H04N 5/275 |
| | | | | 382/103 |
| 2013/0156185 | A1* | 6/2013 | Kim | G08B 13/19686 |
| | | | | 380/210 |
| 2013/0208115 | A1* | 8/2013 | Park | H04N 7/18 |
| | | | | 348/143 |
| 2014/0085480 | A1* | 3/2014 | Saptharishi | H04N 21/23113 |
| | | | | 348/159 |
| 2014/0092963 | A1* | 4/2014 | Wang | H04N 19/70 |
| | | | | 375/240.12 |

| | | | | |
|---|---|---|---|---|
| 2015/0016514 | A1* | 1/2015 | Wang | H04N 19/513 |
| | | | | 375/240.26 |
| 2015/0098613 | A1* | 4/2015 | Gagvani | G08B 13/19697 |
| | | | | 382/103 |
| 2016/0044346 | A1* | 2/2016 | Braness | H04N 21/44055 |
| | | | | 380/210 |
| 2016/0093338 | A1* | 3/2016 | Laska | H04L 9/0822 |
| | | | | 386/224 |
| 2016/0155470 | A1* | 6/2016 | Toma | H04N 21/4825 |
| | | | | 386/355 |
| 2016/0165309 | A1* | 6/2016 | Van Brandenburg | |
| | | | | H04N 21/64322 |
| | | | | 725/116 |
| 2016/0246978 | A1* | 8/2016 | Hong | G06F 21/121 |
| 2016/0315762 | A1* | 10/2016 | Moon | H04L 9/065 |
| 2017/0054697 | A1* | 2/2017 | Zhang | H04N 21/2347 |
| 2017/0076572 | A1* | 3/2017 | Rao | H04N 19/30 |
| 2018/0012460 | A1* | 1/2018 | Heitz, III | G08B 13/19682 |
| 2018/0191690 | A1* | 7/2018 | Lee | H04N 19/91 |
| 2018/0255029 | A1* | 9/2018 | Kim | H04N 21/23895 |
| 2019/0020928 | A1* | 1/2019 | Chan | H04N 21/63345 |
| 2019/0050592 | A1* | 2/2019 | Grau | G06F 21/629 |
| 2019/0068895 | A1* | 2/2019 | Hutz | G06F 18/24143 |
| 2019/0104283 | A1* | 4/2019 | Wakeyama | G08B 13/19658 |
| 2020/0137136 | A1* | 4/2020 | Skupin | H04N 21/8456 |
| 2020/0349188 | A1* | 11/2020 | Ahrens | G06F 16/5866 |
| 2021/0232778 | A1* | 7/2021 | Li | H04M 1/658 |
| 2021/0304796 | A1* | 9/2021 | Yang | H04N 5/272 |
| 2021/0306561 | A1* | 9/2021 | VanBlon | H04N 5/2621 |
| 2022/0070234 | A1* | 3/2022 | Deole | H04L 65/1069 |
| 2022/0083676 | A1* | 3/2022 | San Pedro | G06V 20/52 |
| 2022/0207282 | A1* | 6/2022 | Dong | G06V 40/166 |
| 2022/0215727 | A1* | 7/2022 | Jeong | G08B 29/186 |
| 2022/0222815 | A1* | 7/2022 | Zeineh | G06T 7/194 |
| 2022/0286667 | A1* | 9/2022 | Lu | H04N 19/167 |
| 2022/0335124 | A1* | 10/2022 | Sachs | G06F 21/552 |
| 2022/0335815 | A1* | 10/2022 | Dice | G08B 27/005 |
| 2022/0394330 | A1* | 12/2022 | Sai | H04N 19/40 |
| 2022/0415147 | A1* | 12/2022 | Lindsey | H10D 64/513 |
| 2023/0067541 | A1* | 3/2023 | Boyce | H04N 19/167 |
| 2023/0419801 | A1* | 12/2023 | Lindsey | G08B 13/19669 |
| 2024/0163458 | A1* | 5/2024 | Kim | H04N 19/13 |

FOREIGN PATENT DOCUMENTS

| | | | | | |
|---|---|---|---|---|---|
| EP | | 1788813 | A2 * | 5/2007 | H04N 7/167 |
| EP | | 2294819 | B1 * | 3/2020 | H04N 21/25841 |
| JP | | 2004531780 | A * | 10/2004 | H04L 67/1001 |
| WO | WO-2010002761 | A1 * | 1/2010 | H04N 21/2396 |
| WO | WO-2012046899 | A1 * | 4/2012 | G06V 20/52 |
| WO | WO-2016122003 | A1 * | 8/2016 | H04N 21/4408 |
| WO | WO-2017069489 | A1 * | 4/2017 | H04L 9/0863 |

OTHER PUBLICATIONS

Varlakshmi, L. M., G. Florence Sudha, and G. Jaikishan. "An efficient scalable video encryption scheme for real time applications." Procedia Engineering 30 (2012): 852-860. (Year: 2012).*
Park, Youngkyung et al. WO2012046899A1 (machine translation), published Apr. 12, 2012. (Year: 2012).*
Lee Chul Hui et al. WO2016122003A1 (machine translation), published Aug. 4, 2016. (Year: 2016).*

* cited by examiner

START

RECEIVE BITSTREAM — S910

IDENTIFY SECOND ENCRYPTION UNIT — S920

OBTAIN TABLE — S930

IDENTIFY FIRST ENCRYPTION UNIT — S940

DECRYPT FIRST ENCRYPTION UNIT — S950

GENERATE IMAGE — S960

END

S920

CHECK SIZE OF TABLE — S931

GENERATE TABLE — S932

S940

SURVEILLANCE CAMERA SYSTEM

CROSS-REFERENCE TO RELATED APPLICATION

This application is a continuation of U.S. application Ser. No. 17/515,786 filed on Nov. 1, 2021. In addition, this application claims priority from Korean Patent Application No. 10-2021-0105411, filed on Aug. 10, 2021, in the Korean Intellectual Property Office, the disclosure of which is incorporated by reference herein in its entirety.

BACKGROUND

1. Field

One or more embodiments relate to an image processing device for encrypting image data of a series of one or more units, and an image receiving device for decoding image data of a series of one or more units.

2. Description of the Related Art

As the importance of protecting personal information is emphasized, the need for encryption of images obtained from surveillance cameras is also increasing.

In the case of an analog-type surveillance camera, an image could be viewed only from equipment connected to a physical signal line due to the characteristics of hardware and infrastructure. However, in recently used network-type surveillance cameras, an image is transmitted through a network, and thus, there is a problem in that a third party can easily intercept the image as compared with existing analog-type surveillance cameras.

As a method for addressing this problem according to the related art, a method of encrypting the entire image in an image processing device and allowing a receiving device for receiving the image to check the image through decoding has been proposed.

However, since an image is encrypted/decoded differently for each manufacturer of an image processing device (or an image receiving device), there is a problem in that, when there are devices of different manufacturers, interworking between the devices may not work properly.

In addition, most images obtained by a surveillance camera do not require encryption (that is, images, for which the need for personal information protection is not high), and thus, in the related art, resources may be unnecessarily used to encrypt the whole images.

SUMMARY

One or more embodiments include an image encryption method that may be used universally in devices from various manufacturers.

One or more embodiments include a method of efficiently using resources consumed in encryption, by partially encrypting images.

Various aspects of the embodiments will be set forth in part in the description which follows and, in part, will be apparent from the description, or may be learned by practice of the presented embodiments of the disclosure.

According to one or more embodiments, there is provided a method, performed by an image processing device, of encrypting image data. The method may include: selecting an encryption target unit from among a plurality units constituting an image; generating a table including identification information about the encryption target unit; generating a first encryption unit including data obtained by encrypting the encryption target unit; generating a second encryption unit including data obtained by encrypting the table; and generating a bitstream including the first encryption unit, the second encryption unit, and units other than the encryption target unit among the plurality of units constituting the image.

The image data encryption method may further include, prior to the selecting the encryption target unit, selecting a method for selecting the encryption target unit, based on whether the image processing device satisfies a first arithmetic operation condition, wherein the selecting the method for selecting the encryption target unit includes: based on the image processing device satisfying the first arithmetic operation condition, selecting a first method in which the encryption target unit is selected based on analysis of an event in the image; and based on the image processing device not satisfying the first arithmetic operation condition, selecting a second method in which the encryption target unit is selected regardless of whether the event has occurred in the image.

The first method may include: identifying a second time point when a certain event is detected from the image; identifying a first time point at which an object related to the event is identified for the first time in the image; and selecting, as the encryption target unit, at least one unit, included the image, between the first time point and the second time point.

The generating the first encryption unit may include modifying a flag corresponding to an event item of a header of the at least one unit of the image between the first time point and the second time point.

The generating the first encryption unit may include adding data about the event to metadata of the at least one unit of the image between the first time point and the second time point.

The second method may include selecting the encryption target unit randomly.

The selecting the method for selecting the encryption target unit may further include determining a ratio of the encryption target unit among all units constituting the image based on whether the image processing device satisfies a second arithmetic operation condition.

The generating the second encryption unit may include: identifying a size of the table; and generating the second encryption unit including data corresponding to the size of the table and data obtained by encrypting the table.

The encryption target unit may be provided in plurality, and the first encryption unit with respect to each of the plurality of encryption target units may be generated in the generating the first encryption unit, and the second encryption unit may be disposed ahead of the first encryption unit in the bitstream in a temporal sequence.

According to one or more embodiments, there is provided a method, performed by an image receiving device, of decrypting image data. The method may include: identifying a second encryption unit from a bitstream including a plurality units constituting an image, wherein the second encryption unit includes a table including identification information about an encrypted unit among the plurality of units; obtaining the table by decrypting the second encryption unit; identifying at least one first encryption unit from the bitstream by referring to the table; decrypting the at least one first encryption unit; and generating the image by using units, other than the at least one first encryption unit and the second encryption unit, and the decrypted at least one first encryption unit in the bitstream.

The obtaining the table may include: identifying a size of the table from the second encryption unit; and generating the table from the second encryption unit by referring to the size of the table.

According to one or more embodiments, there is provided an image processing device including at least one processor configured to: select an encryption target unit from among a plurality units constituting an image; generate a table including identification information about the encryption target unit; generate a first encryption unit including data obtained by encrypting the encryption target unit; generate a second encryption unit including data obtained by encrypting the table; and generate a bitstream including the first encryption unit, the second encryption unit, and units other than the encryption target unit among the plurality units constituting the image.

The at least one processor may be further configured to: prior to the selecting the encryption target unit, select a method for selecting the encryption target unit, based on whether the image processing device satisfies a first arithmetic operation condition; based on the image processing device satisfying the first arithmetic operation condition, select a first method in which the encryption target unit is selected based on analysis of an event in the image; and based on the image processing device not satisfying the first arithmetic operation condition, select a second method in which the encryption target unit is selected regardless of whether the event has occurred in the image.

The first method may include: identifying a second time point when a certain event is detected from the image; identifying a first time point at which an object related to the event is identified for the first time in the image; and selecting, as the encryption target unit, at least one unit, included the image, between the first time point and the second time point.

For the generating the first encryption unit, the at least one processor may modify a flag corresponding to an event item of a header of the at least one unit of the image between the first time point and the second time point.

For the generating the first encryption unit, the at least one processor may add data about the event to metadata of the at least one unit of the image between the first time point and the second time point.

The second method may include randomly selecting the encryption target unit.

For the selecting the method for selecting the encryption target unit, the at least one processor may determine a ratio of the encryption target unit among all units constituting the image based on whether the image processing device satisfies a second arithmetic operation condition.

For the generating the second encryption unit, the at least one processor may check a size of the table, and generate the second encryption unit including data corresponding to the size of the table and data obtained by encrypting the table.

The encryption target unit may be provided in plurality, and the at least one processor may generate the first encryption unit with respect to each of the plurality of encryption target units, and dispose the second encryption unit ahead of the first encryption unit in the bitstream in a temporal sequence.

According to one or more embodiments, there is provided an image receiving device including at least one processor configured to: identify a second encryption unit from a bitstream including a plurality units constituting an image, wherein the second encryption unit includes a table including identification information about an encrypted unit among the plurality of units; obtain the table by decrypting the second encryption unit; identify at least one first encryption unit from the bitstream by referring to the table; decrypt the at least one first encryption unit; and generate the image by using units, other than the at least one first encryption unit and the second encryption unit, and the decrypted at least one first encryption unit in the bitstream.

For the obtaining the table, the at least one processor may check a size of the table from the second encryption unit, and generate the table from the second encryption unit by referring to the size of the table.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
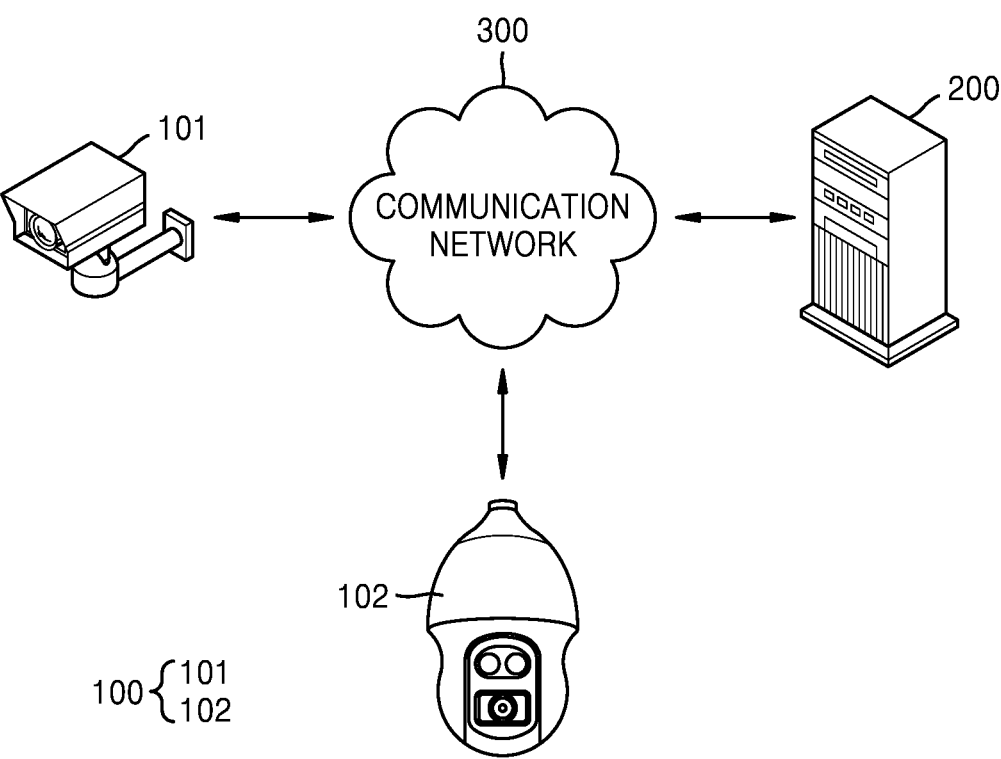
FIG. 1 is a schematic diagram of a surveillance camera system, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Since the present disclosure may have various modifications and several embodiments, certain embodiments are shown in the drawings and will be described in detail. Advantages and features of the present disclosure and a method of achieving the same will be specified with reference to the embodiments described below in detail together with the attached drawings. However, the present disclosure may have different forms and should not be construed as being limited to the descriptions set forth herein.

The embodiments of the present disclosure will be described below in more detail with reference to the accompanying drawings. Those components that are the same or are in correspondence are rendered the same reference numeral regardless of the figure number, and redundant explanations are omitted.

It will be understood that although the terms "first", "second", etc. may be used herein to describe various components, these components should not be limited by these terms. These components are only used to distinguish one component from another. Singular expressions, unless defined otherwise in contexts, include plural expressions. In the embodiments below, it will be further understood that the terms "comprise" and/or "have" used herein specify the presence of stated features or components, but do not preclude the presence or addition of one or more other features or components. Also, in the drawings, for convenience of description, sizes of elements may be exaggerated or contracted. In other words, since sizes and thicknesses of components in the drawings are arbitrarily illustrated for convenience of explanation, the present disclosure is not limited thereto.

FIG. 1 is a schematic diagram of a surveillance camera system, according to an embodiment.

The surveillance camera system according to an embodiment may transmit and receive image data after encrypting the image data in units. The surveillance camera system may select a method for selecting or determining (hereinafter "selecting") an encryption target unit, which is at least one unit among a plurality units constituting an image which is a target of encryption, according to the performance and/or specifications of an image transmission device. In addition, the surveillance camera system may generate a table including identification information about at least one encrypted unit which may include the encryption target unit, encrypt the table and transmit or receive the same.

In the present disclosure, a "unit" may refer to standardized data including at least a portion of an image, such as a moving image or video, for transmission and reception of the image. For example, a unit may refer to a network abstraction layer (NAL) unit generated by compressing an image according to the H.264 compression method. However, this is an example, and the present disclosure is not limited thereto.

In the present disclosure, a "table" may refer to data including identification information about encrypted units among a plurality of units constituting an image. For example, when an image is formed of 10 video coding layer (VCL) NAL units, the table may indicate that selected units (e.g., first, fourth, sixth, ninth, and tenth VCL NAL units) are encrypted. However, this is an example, and the present disclosure is not limited thereto.

In the present disclosure, a "bitstream" may refer to the above-described units that are listed according to the passage of time. For example, a bitstream may be a time-series arrangement of a plurality of units constituting an image for transmission of the image.

As illustrated in FIG. 1, the surveillance camera system according to an embodiment may include a surveillance camera 100 (hereinafter, also referred to as a first surveillance camera 101 and a second surveillance camera 102) as an image transmitting device, an image storage device 200 as an image receiving device, and a communication network 300 for interconnecting them.

The surveillance camera 100 according to an embodiment may be a device that obtains an image of the surrounding environment, partially encrypts the image, and transmits the encrypted image to another device. In the present disclosure, the surveillance camera 100 may be occasionally named and described as an image processing device.

Figure 2:
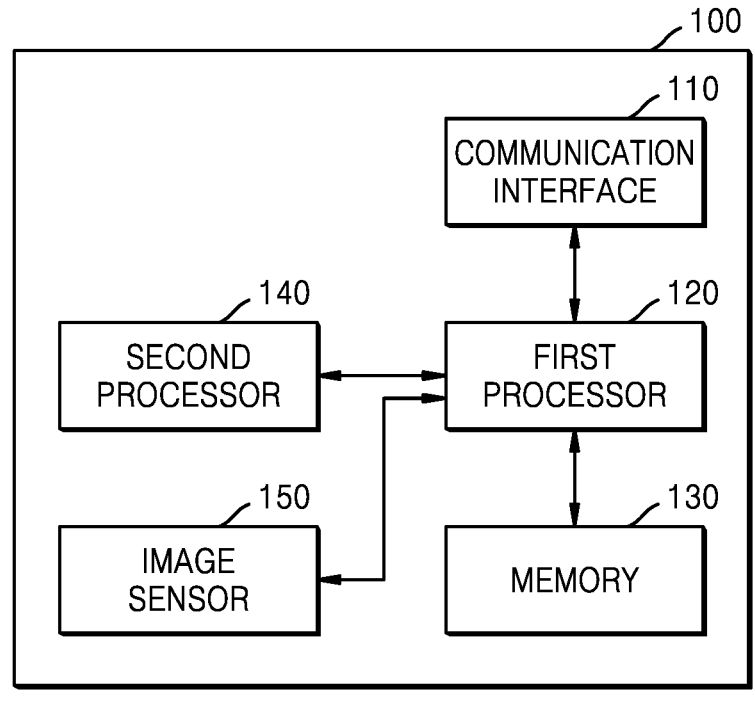
FIG. 2 is a schematic structural diagram of a surveillance camera, according to an embodiment.

FIG. 2 is a schematic structural diagram of the surveillance camera 100, according to an embodiment;

Referring to FIG. 2, the surveillance camera 100 according to an embodiment may include a communication interface 110, a first processor 120, a memory 130, a second processor 140, and an image sensor 150. The surveillance camera 100 may represent either of the first and surveillance cameras 101 and 102 shown in FIG. 1.

The communication interface 110 may be a device that transmit and receive an image or the like through a wired/wireless connection with another network device such as the image storage device 200. The communication interface may include any one or any combination of a digital modem, a radio frequency (RF) modem, a WiFi chip, and related software and/or firmware.

The first processor 120 may be a device for controlling a series of processes of obtaining an image, segmenting the obtained image into units, and transmitting the units of the image to another network device such as the image storage device 200 through the communication interface 110. Here, the term "processor" may refer to, for example, a data processing device that is embedded in a hardware component and has a physically structured circuit to perform a function expressed as a code or a command included in a program. Examples of the data processing device embedded in a hardware component may encompass processing devices such as a microprocessor, a central processing unit (CPU), a processor core, a multiprocessor, an application-specific integrated circuit (ASIC), a field programmable gate array (FPGA), and the like, but the present disclosure is not limited thereto.

The memory 130 performs a function of temporarily or permanently storing data processed by the surveillance camera 100. The memory may include magnetic storage media or flash storage media, but the scope of the present disclosure is not limited thereto. For example, the memory 130 may temporarily and/or permanently store an obtained image.

The second processor 140 may refer to a device that performs an operation under the control by the above-described first processor 120. In this case, the second processor 140 may be a device having a higher arithmetic capacity than the first processor 120 described above. For example, the second processor 140 may be configured as a graphics processing unit (GPU). However, this is an example, and the present disclosure is not limited thereto. In an embodiment, one second processor 140 may be provided or the second processor 140 may be provided in plurality.

The surveillance camera 100 according to an embodiment may not include the second processor 140. For example, in FIG. 1, a first surveillance camera 101 may be configured to include a second processor, and a second surveillance camera 102 may be configured not to include the second processor.

The image sensor 150 may refer to various types of devices that convert an optical signal into an electrical signal. For example, the image sensor 150 may include a device that obtains ambient light and converts the same into an electrical signal, that is, in the form of an image, such as a charge-coupled device (CCD) or a complementary metal oxide semiconductor (CMOS).

The surveillance camera 100 according to an embodiment may not include the image sensor 150. In this case, despite the word "camera" in its name, the surveillance camera 100 may be a device that performs a function of transmitting an image stored in the memory 130 or an image received from an external device (not shown) to another device.

The image storage device 200 according to an embodiment may be a device for receiving an encrypted image from the surveillance camera 100 and decrypting and decoding the received image. For example, the image storage device 200 may be any one of a Video Management System (VMS), a Central Management System (CMS), a Network Video Recorder (NVR), and a Digital Video Recorder (DVR), or a device included in any one of these.

In the present disclosure, the image storage device 200 is occasionally referred to as an image receiving device. According to an embodiment, the image storage device (the image receiving device) may also include at least one processor, a memory and a communication interface similar to the first and second processors 120 and 140, the memory 130 and the communication interface 110 of the surveillance camera 100 for similar functions.

The communication network 300 according to an embodiment may include, for example, a wired network such as local area networks (LANs), wide area networks (WANs), metropolitan area networks (MANs), integrated service digital networks (ISDNs) or wireless LANs, code-division multiple access (CDMA), Bluetooth, and other wireless networks such as satellite communication, but the present disclosure is not limited thereto.

Hereinafter, a process of encrypting an image and a process of decoding an image in a surveillance camera system according to an embodiment will be sequentially described.

Process of Encrypting Image in Image Processing Device

An image processing device according to an embodiment may encrypt an obtained image in units, and transmit the image to another device such as the image storage device 200 or a user terminal (not shown). The image processing device may correspond to, for example, the surveillance camera 100 of FIG. 1.

Figure 3:
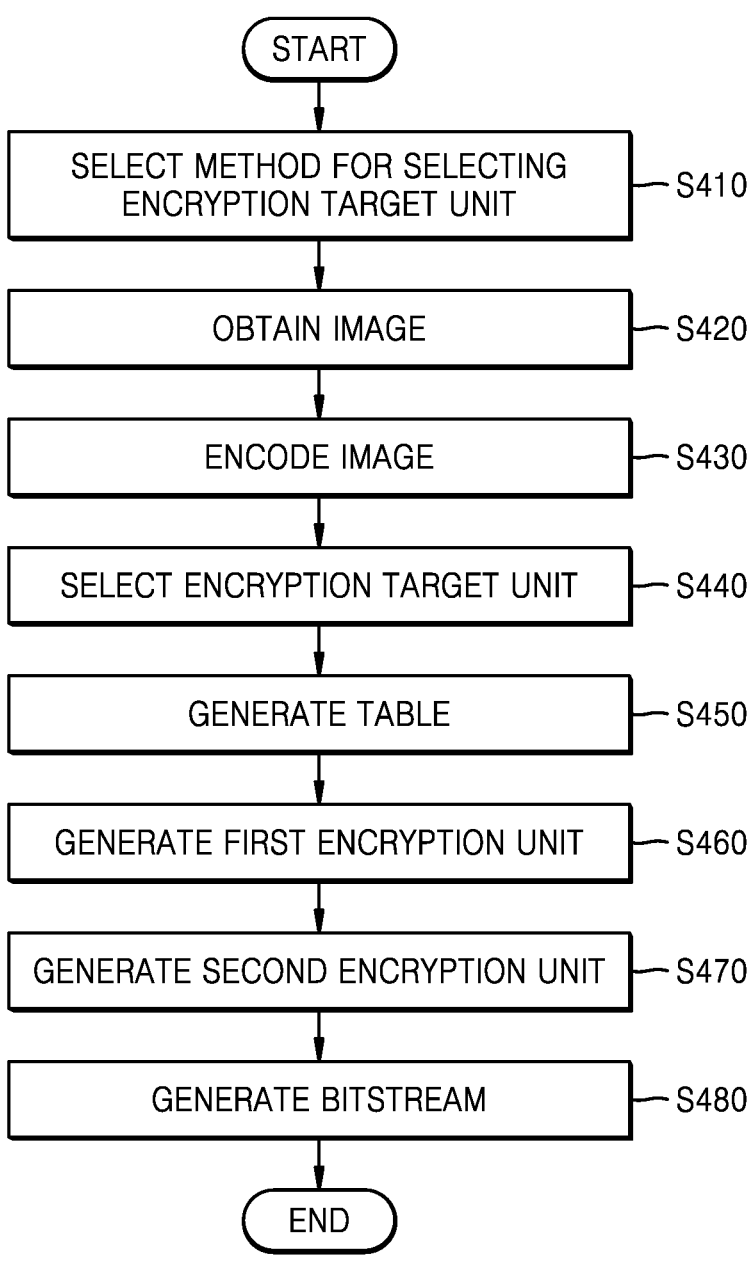
FIG. 3 is a flowchart of an image data encryption method performed by an image processing device, according to an embodiment.

FIG. 3 is a flowchart of an image data encryption method performed by an image processing device, according to an embodiment. Hereinafter, description will be given with reference to FIGS. 4 to 8 together with FIG. 3.

The image processing device according to an embodiment may select a method for selecting the encryption target unit (S410). For example, the image processing device may select a method whereby at least one unit, which is the target of encryption among a plurality units forming an image, is selected based on whether the image processing device itself satisfies a first arithmetic operation condition. The first arithmetic operation condition may be appropriately set according to the purpose or use of a surveillance camera system. For example, the first arithmetic operation condition may be a condition for determining whether an operation using an artificial neural network is possible by the image processing device.

When the first arithmetic operation condition is satisfied, the image processing device may select a first method for selecting an encryption target unit. In the first method, an encryption target unit may be selected in an image based on analysis of an event included in the image.

When the first arithmetic operation condition is not satisfied, the image processing device may select a second method for selecting an encryption target unit. The second method may be selecting an encryption target unit regardless of whether an event has occurred in an image. For example, in the second method, an encryption target unit may be randomly selected from an image.

According to another embodiment, the image processing device may select a method for selecting an encryption target unit, based on whether a processor (e.g., the second processor 140 of FIG. 2) for the operation of an artificial neural network is included therein.

When the image processing device includes a processor for operation of an artificial neural network, the image processing device may select the first method for selecting an encryption target unit. In the first method, an encryption target unit may be selected in an image based on analysis of an event included in the image.

When the image processing device does not include a processor for operation of an artificial neural network, the image processing device may select the second method for selecting an encryption target unit. The second determination method may be selecting an encryption target unit regardless of whether an event has occurred in an image. For example, in the second method, an encryption target unit may be randomly selected from an image.

According to an embodiment, the image processing device may determine a ratio of encryption target units among all units (that is, all units constituting an image) based on whether the second arithmetic operation condition is satisfied. The second arithmetic operation condition may be, for example, a condition in which speed of operation of resources per second exceed a first threshold resource or a condition in which a size of available resources exceeds a second threshold resource. However, the above-described conditions are an example, and the present disclosure is not limited thereto.

As described above, according to the present disclosure, a method of processing an image may be selected according to the specifications of an image processing device.

The image processing device according to an embodiment may obtain an image (S420), and encode the image (S430). As described above, the image processing device may include, for example, the surveillance camera 100. Accordingly, the image processing device may obtain an image through the image sensor 150, and encode (or compress) the image by using the first processor 120. The image processing device may encode an image by using a certain codec (or a compression method). For example, the image processing device may compress an image according to the H.264 compression method. The obtained image may be compressed in units according to encoding. The process of obtaining an image or encoding the obtained image, by the image processing device, is not in the scope of the present disclosure, and thus, detailed descriptions thereof will be omitted herein.

The image processing device according to an embodiment may select an encryption target unit from among one or more units generated in operation S430 (S440). Here, the image processing device may select the encryption target unit among the one or more units according to the method for selecting an encryption target unit, selected in operation S410.

Figure 4:
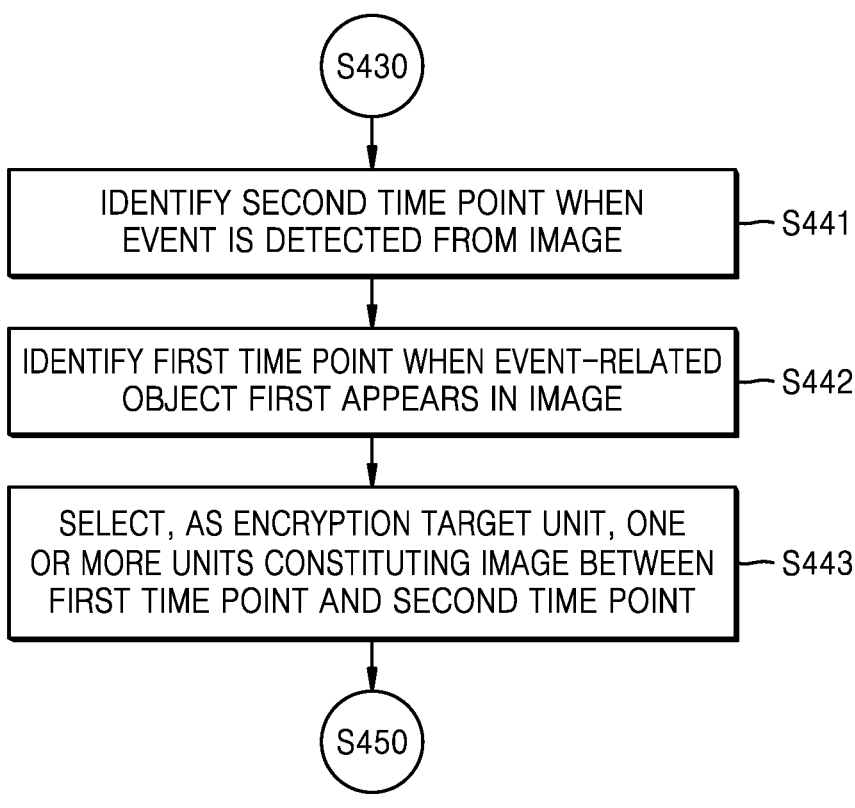
FIGS. 4 and 5 are diagrams for describing an operation of an image processing device when a first determination method is selected as a method of determining an encryption target unit in operation S410 shown in FIG. 3, according to embodiments.
Figure 5:
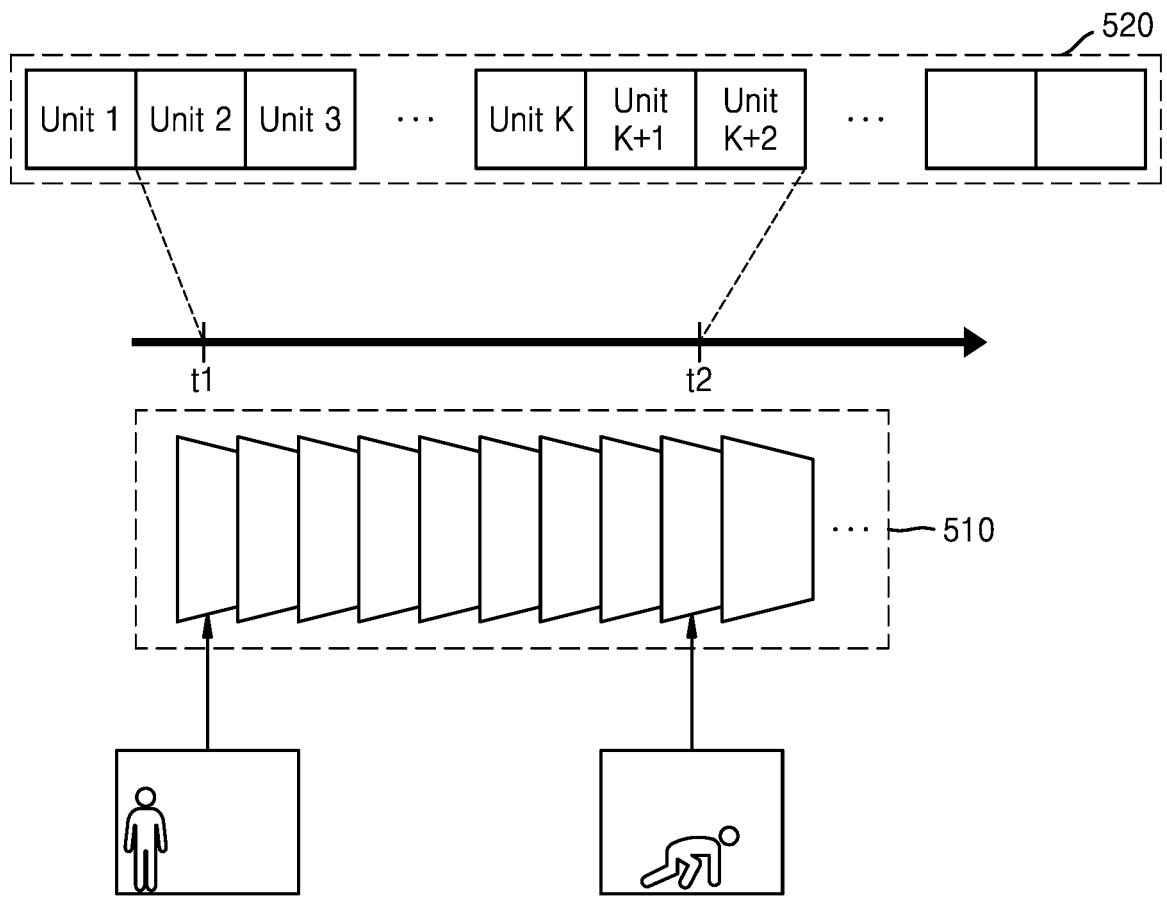

FIGS. 4 and 5 are diagrams for describing an operation of an image processing device when the first method is selected as a method of selecting an encryption target unit in operation S410 shown in FIG. 3, according to embodiments. The first method may be selecting an encryption target unit based on analysis of an event in an image 510, as described above.

In an embodiment, the image processing device may detect an event from the image 510 by using an artificial neural network trained according to a purpose. For example, the image processing device may detect an event from the image 510 by using an artificial neural network trained to detect a fall of a person, from the image. The image processing device may also detect an event from the image 510 by using an artificial neural network trained to detect, for example, a fire from the image 510 or detect a fight between humans from the image 510. However, the above-described artificial neural networks are examples, and the present disclosure is not limited thereto.

The image processing device according to an embodiment may identify a second time point, which is a time point at which a certain event is detected from the image 510 (S441). For example, when detecting an event by using an artificial neural network trained to detect, for example, a fall of a person, the image processing device may identify a time point t2, which is a time point at which a fall is detected from the image 510, as the second time point.

The image processing device according to an embodiment may identify a first time point at which an object related to the event detected in operation S441 identified for the first time in the image 510 (S442). For example, the image processing device may detect, as the first time point, a time point t1, which is a time point when a person who is detected to have fallen first appears.

The image processing device according to an embodiment may select, as an encryption target unit, one or more units constituting an image between the first time point identified in operation S442 and the second time point identified in operation S441 (S443). For example, the image processing device may select, as an encryption target unit, from a second unit to a $(K+2)^{th}$ unit among a plurality of units 520 constituting the image.

In an image processing device which is of sufficient performance or has sufficient resources to analyze the image 510, the first method as described above may be used.

As illustrated in FIG. 5, the image 510 may include a plurality of frames, and each unit may include data corresponding to at least a portion of each frame. For example, data with respect to one frame may be included in one unit, and data with respect to one frame may be included in two or more units. However, this is an example, and the present disclosure is not limited thereto. The unit may include one or more slices of each frame according to an embodiment.

In an embodiment, in addition to units selected as encryption target units in operation S443, an additional unit may be further selected as an encryption target unit.

For example, the image processing device may identify a third time point when a certain period of time has elapsed from the second time point, which is the time point at which an event is detected. Also, the image processing device may select one or more units constituting an image between the second and third time points as an encryption target unit. According to the above embodiment, as a result, one or more units constituting an image from the first to third time point may be selected as encryption target units.

Figure 6:
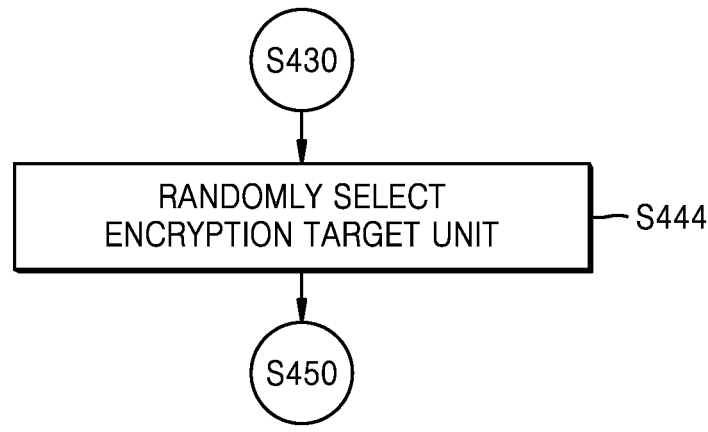
FIG. 6 is a diagram for describing an operation of an image processing device when a second determination method is selected as a method of determining an encryption target unit in operation S410 shown in FIG. 3, according to an embodiment.

FIG. 6 is a diagram for describing an operation of an image processing device when the second method is selected as a method for selecting an encryption target unit in operation S410 shown in FIG. 3, according to an embodiment. The second method may be selecting an encryption target unit regardless of whether an event has occurred in an image, as described above. For example, according to the second method, an encryption target unit may be randomly selected from among one or more units of an image.

The image processing device according to an embodiment may randomly select an encryption target unit regardless of whether an event has occurred in the image 510 (S444). For example, in FIG. 5, the image processing device may select a first unit, a fourth unit, a $(K+1)^{th}$ unit, and a $(K+8)$th unit as encryption target units.

In an image processing device which is of insufficient performance or has insufficient resources to analyze the image 510, the second method as described above may be used.

Figure 7:
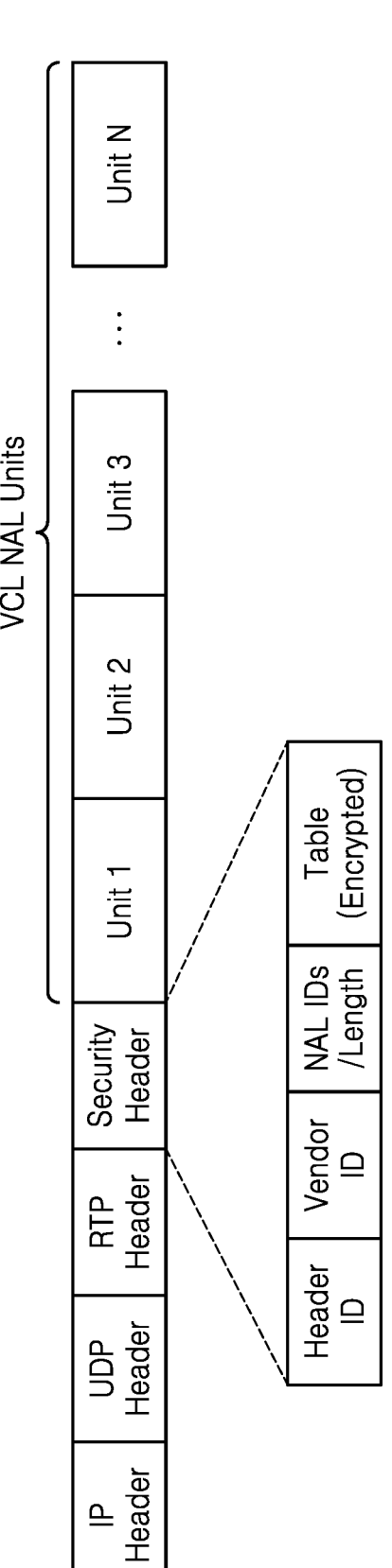
FIG. 7 is a diagram for describing a configuration of a bitstream generated by an image processing device, according to an embodiment.
Figure 8:
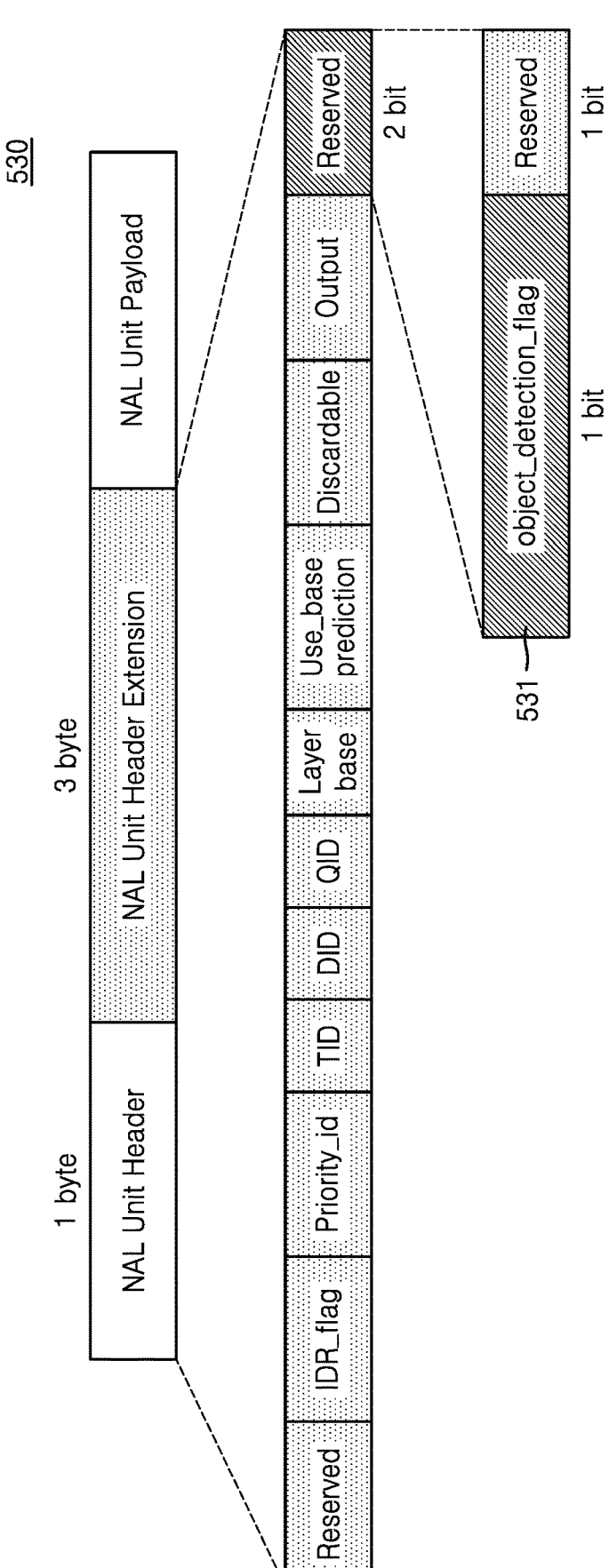
FIG. 8 is a diagram for describing a configuration of an individual video coding layer (VCL) network abstraction layer (NAL) unit.

FIG. 7 is a diagram for describing a configuration of a bitstream generated by an image processing device, according to an embodiment. FIG. 8 is a diagram for describing a configuration of an individual VCL NAL unit 530.

Referring to FIG. 7, the bitstream may have a form in which an IP Header unit, a User Datagram Protocol (UDP) Header unit, a Real-Time Transport Protocol (RTP) Header unit, a Security Header unit, and one or more VCL NAL units are disposed in a time series or temporal sequence. In this case, the Security Header unit may include a table including identification information about encrypted units, which will be described later.

Meanwhile, referring to FIG. 8, the individual VCL NAL unit 530 may include a NAL unit Header area, a NAL unit Header Extension area, and a NAL Unit Payload area. The NAL Unit Header Extension area may include an event flag 531 indicating an event detected from an image. A process of setting the event flag 531 will be described later.

Referring back to FIG. 3, the image processing device according to an embodiment may generate a table including identification information about an encryption target unit (S450). For example, the image processing device may generate identification information about the encryption target units selected in operation S440, and generate a table in which the identification information is recorded.

The image processing device according to an embodiment may generate a first encryption unit including data obtained by encrypting an encryption target unit by using a first encryption method (S460). For example, the image processing device may generate a first encryption unit by encrypting a NAL unit payload item of an encryption target unit. The "first encryption method" may be any one of known data encryption methods. Similarly, a "second encryption method" to be described later may also be any one of known data encryption methods. These encryption methods may use at least one encryption key for encrypting units of an image or data referred to in the embodiments herein. The at least one encryption kay may include a pseudo-random encryption key.

Here, the image processing device may encrypt only a certain unit (i.e., a unit described in the table) among one or more units constituting an image with reference to the table generated in operation S450.

When the first method is selected as the method for selecting an encryption target unit is selected in S410, the image processing device according to an embodiment may modify a flag corresponding to an event item of a header of the one or more units constituting an image between the first time point and the second time point. Referring back to FIG. 8, the image processing device may modify the event flag 531 indicating an event in a NAL Unit Header Extension area of the first encryption unit based on whether the event has occurred and/or the type of the event. Accordingly, the image processing device may generate an encrypted unit by including information about whether an event has occurred.

Meanwhile, the image processing device may add event-related data to metadata of the one or more units constituting the image between the first time point and the second time point, similar to the setting of a flag described above. In this case, the metadata may be data for describing the image, and may distinguish from the image.

According to an embodiment, the image processing device may modify a flag and/or metadata corresponding to an event item in a header of one or more units constituting the image between the first time point and the third time point.

The image processing device according to an embodiment may generate a second encryption unit including data obtained by encrypting the table generated in operation S450 by using the second encryption method (S470).

The image processing device may check a size of the table and generate the second encryption unit including data corresponding to the size of the table and data obtained by encrypting the table. Referring back to FIG. 7, the image processing device may generate a Security Header unit as the second encryption unit. Here, the image processing device may add data corresponding to the size of the table to a NAL IDs/Length item of the Security Header unit, and may add data obtained by encrypting the table to the Table (Encrypted) item.

The image processing device according to an embodiment may generate a bitstream including the first encryption unit, the second encryption unit, and units other than the encryption target units among the one or more units constituting an image (S480).

For example, as illustrated in FIG. 7, the image processing device may generate a bitstream in a form in which the second encryption unit (i.e., the Security Header unit) precedes the first encryption unit including the encryption target units. Also, the first encryption unit generated from each of the encryption target units may be used in place of an original encryption target unit. For example, when the second unit (unit 2) is an encryption target unit in FIG. 7, the first encryption unit generated from the second unit may be arranged between the first unit (unit 1) and the third unit (unit 3), in place of the second unit.

Thus, according to the present embodiment, a bitstream having units, some of which are encrypted, may be generated, and the bitstream may include identification information about the encrypted units.

In addition, according to the present embodiment, a method of selecting an encryption target unit and/or a ratio of an encryption target unit may be dynamically determined according to the specifications of the image processing device.

In the above embodiments, the encryption process described above in reference to FIGS. 3-8 may be performed by the second processor 140 or the first processor 120 when the image processing device does not include the second processor 140.

Process of Decrypting Image in Image Receiving Device

The image receiving device according to an embodiment may receive and decode image data formed of one or more units disposed in a temporal sequence. The image receiving device may correspond to, for example, the image storage device 200 of FIG. 1.

Figure 9:
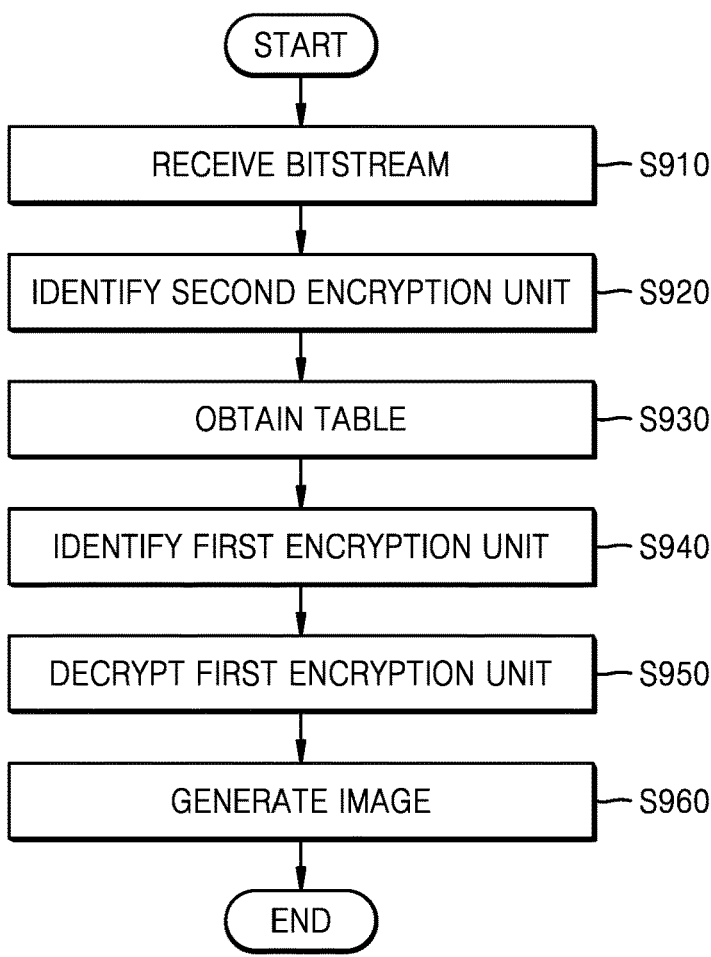
FIGS. 9 and 10 are flowcharts of an image data decoding method performed by an image receiving device, according to embodiments.
Figure 10:
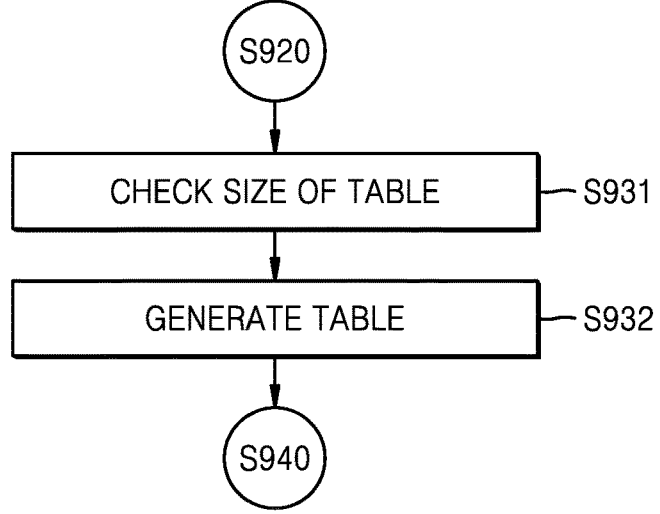

FIG. 9 is a flowchart of an image data decryption method performed by an image receiving device, for example, by at least one processor included in the image receiving device. Hereinafter, description will be given with reference to both FIGS. 9 and 10.

The image receiving device according to an embodiment may receive a bitstream (S910). The bitstream is generated by the image processing device described with reference to FIGS. 3 through 8, and may be, for example, the bitstream illustrated in FIG. 7.

The image receiving device according to an embodiment may identify the second encryption unit from the bitstream received in operation S910 (S920). In this case, the second encryption unit may be a unit including a table including identification information about an encrypted unit among one or more units of an image forming the bitstream, as described above.

The image receiving device according to an embodiment may decrypt the second encryption unit identified in operation S920 to obtain a table (S930).

In detail, the image receiving device may check a size of the table from the second encryption unit (S931). For example, the image receiving device may refer to the NAL IDs/Length item of the Security Header unit corresponding to the second encryption unit, to check the size of the table.

Also, the image receiving device may generate a table from the second encryption unit by referring to the checked size of the table (S932). For example, the image receiving device may determine the number of bits corresponding to the table from the checked size of the table, and generate a table by reading the determined number of bits from the Table (Encrypted) item of the Security Header unit based on the determined number of bits.

The image receiving device according to an embodiment may identify one or more first encryption units in the bitstream with reference to the table obtained in operation S930 (S940). The image receiving device may decrypt the identified one or more first encryption units (S950).

Finally, the image receiving device may generate an image by using units other than the one or more first encryption units and a second encryption unit in the bitstream and using the decrypted first encryption units (S960). It is noted here that the image generated at operation S960 may be still in the form of encoded or compressed using a certain codec complying a given standard, for example, the H.264 standard. Thus, the image may be decoded or decompressed according to the given standard, which is not in the scope of the present disclosure, and thus, detailed descriptions thereof will be omitted herein.

Thus, according to the present disclosure, units constituting an image may be selectively encrypted and transmitted or received.

The embodiments described above can be implemented as computer programs that can be executed using various components on a computer and can be written to a computer-readable recording medium. Examples of the computer-readable recording medium may include magnetic media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). Furthermore, the media may include an intangible medium implemented in a form that can be transmitted on a network, for example, may be a type of medium that is implemented in the form of software or an application and can be transmitted and distributed through a network.

The computer programs may be specifically designed and configured for the embodiments or may be well-known and available to one of ordinary skill in the art. Examples of the program programs include not only machine codes generated by using a compiler but also high-level language codes that can be executed on a computer by using an interpreter or the like.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors between elements shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

According to the present disclosure, an image encryption method that may be universally used in devices from various manufacturers may be provided.

Moreover, according to the present disclosure, by partially encrypting an image, resources consumed in encryption may be efficiently used and a high level of encryption may be maintained.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method, performed by an image processing device, of encrypting image data, the method comprising:

selecting a method for selecting an encryption target unit, based on at least one of performance or resources of an image processing device;

selecting an encryption target unit from among a plurality of units constituting an image based on the method for selecting the encryption target unit;

generating an encryption unit by encrypting the encryption target unit;

generating a bitstream comprising the encryption unit; and based on the image processing device satisfying the first arithmetic operation condition, selecting a first method in which the encryption target unit is selected based on analysis of an event in the image;

based on the image processing device not satisfying a first arithmetic operation condition, selecting a second method in which the encryption target unit is selected; and wherein the first method comprises:

identifying a second time point when a certain event is detected from the image;

identifying a first time point at which an object related to the event is identified for the first time in the image;

selecting, as the encryption target unit, at least one unit, included in the image, between the first time point and the second time point; and wherein the generating an encryption unit comprises adding data about the event to metadata of the at least one unit of the image between the first time point and the second time point.

2. The method of claim 1, wherein the generating an encryption unit comprises modifying a flag corresponding to an event item of a header of the at least one unit of the image between the first time point and the second time point.

3. The method of claim 1, wherein the encryption target unit is provided in plurality, wherein a first encryption unit with respect to each of the plurality of encryption target units is generated in generating the first encryption unit, and wherein a second encryption unit is disposed ahead of the first encryption unit in the bitstream in a temporal sequence.

4. The method of claim 1, wherein the image processing device is a device that partially encrypts the image, and transmits the encrypted image to another device.

5. A method, performed by an image processing device, of encrypting image data, the method comprising:

selecting a method for selecting the encryption target unit, based on at least one of performance or resources of an image processing device;

selecting an encryption target unit from among a plurality of units constituting an image based on the method for selecting the encryption target unit;

generating an encryption unit by encrypting the encryption target unit;

generating a bitstream comprising the encryption unit; and based on the image processing device satisfying a first arithmetic operation condition, selecting a first method in which the encryption target unit is selected based on analysis of an event in the image;

based on the image processing device not satisfying the first arithmetic operation condition, selecting a second method in which the encryption target unit is selected; and wherein the selecting the method for selecting the encryption target unit further comprises determining a ratio of the encryption target unit among all units constituting the image based on whether the image processing device satisfies a second arithmetic operation condition.

6. The method of claim 5, wherein the encryption target unit is provided in plurality, wherein a first encryption unit with respect to each of the plurality of encryption target units is generated in generating the first encryption unit, and wherein a second encryption unit is disposed ahead of the first encryption unit in the bitstream in a temporal sequence.

7. The method of claim 5, wherein the image processing device is a device that partially encrypts the image, and transmits the encrypted image to another device.

* * * * *